Figure 12:
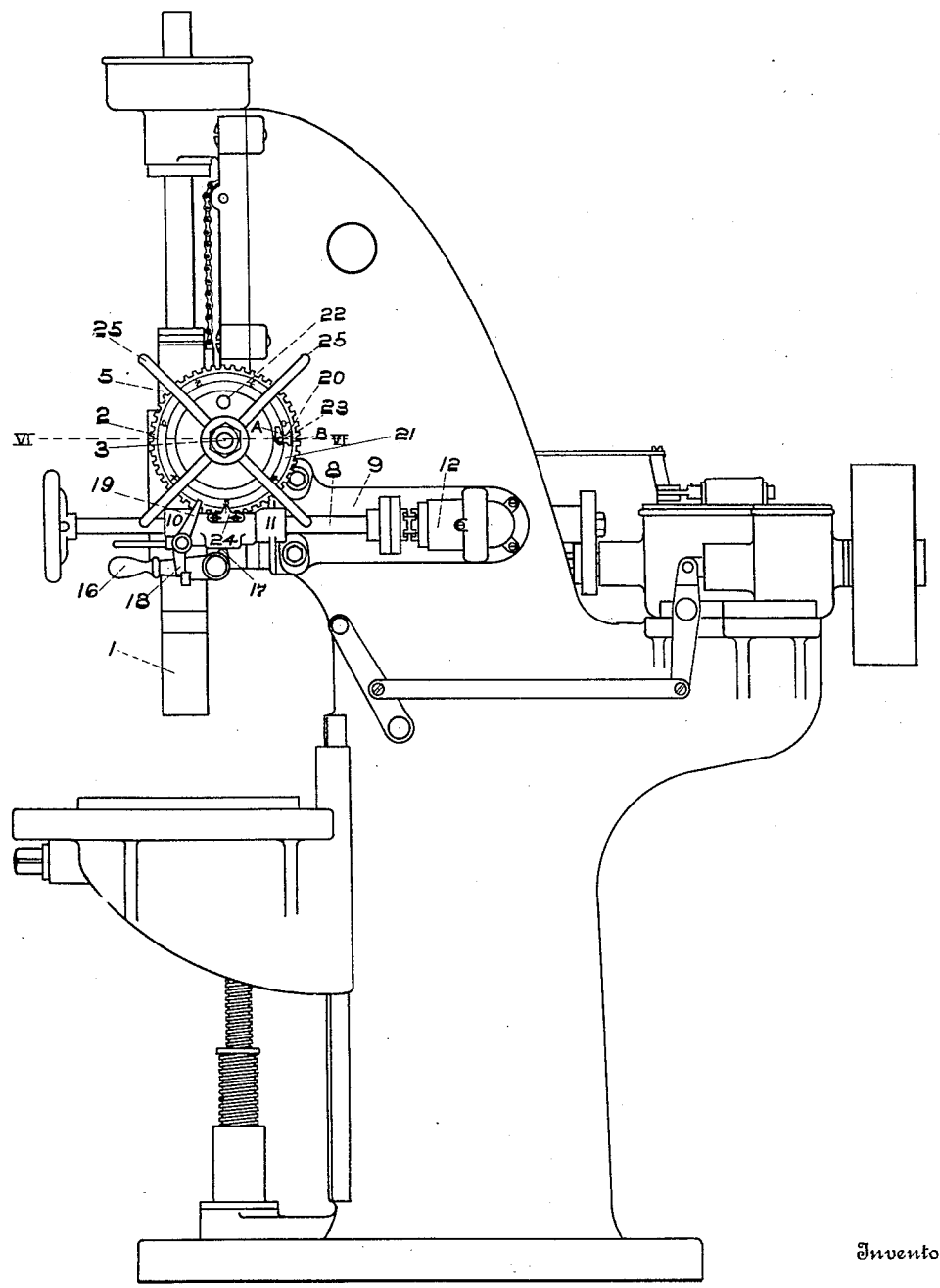

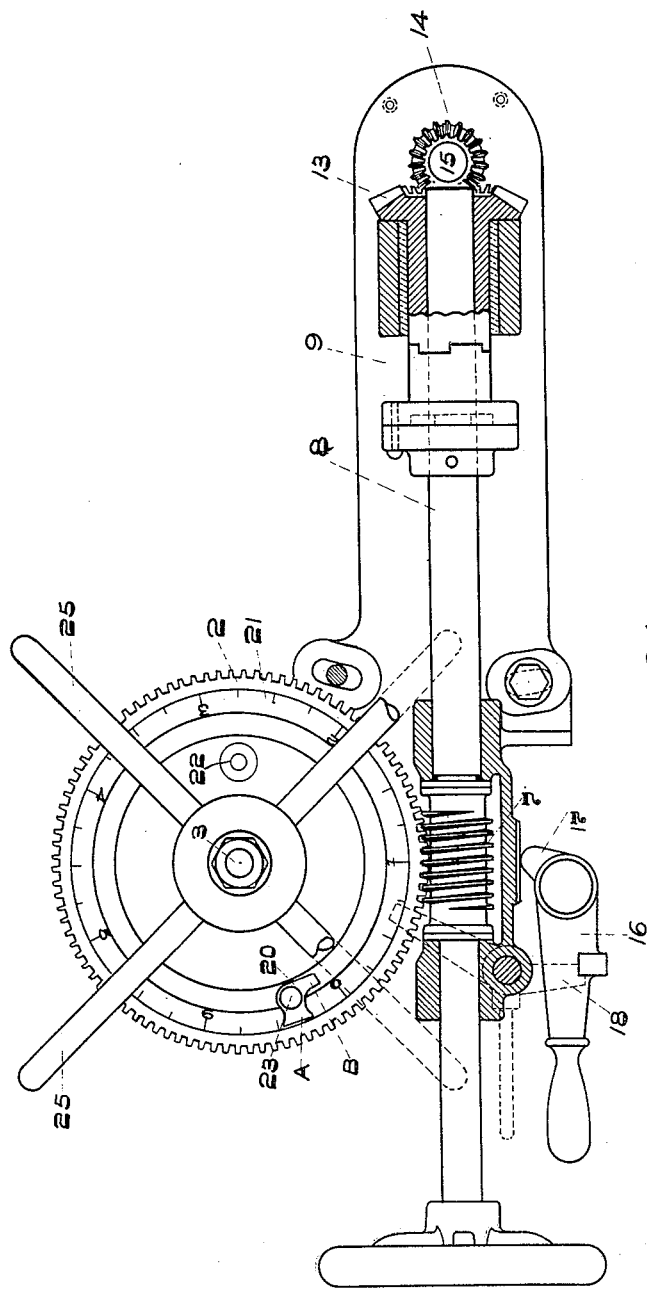

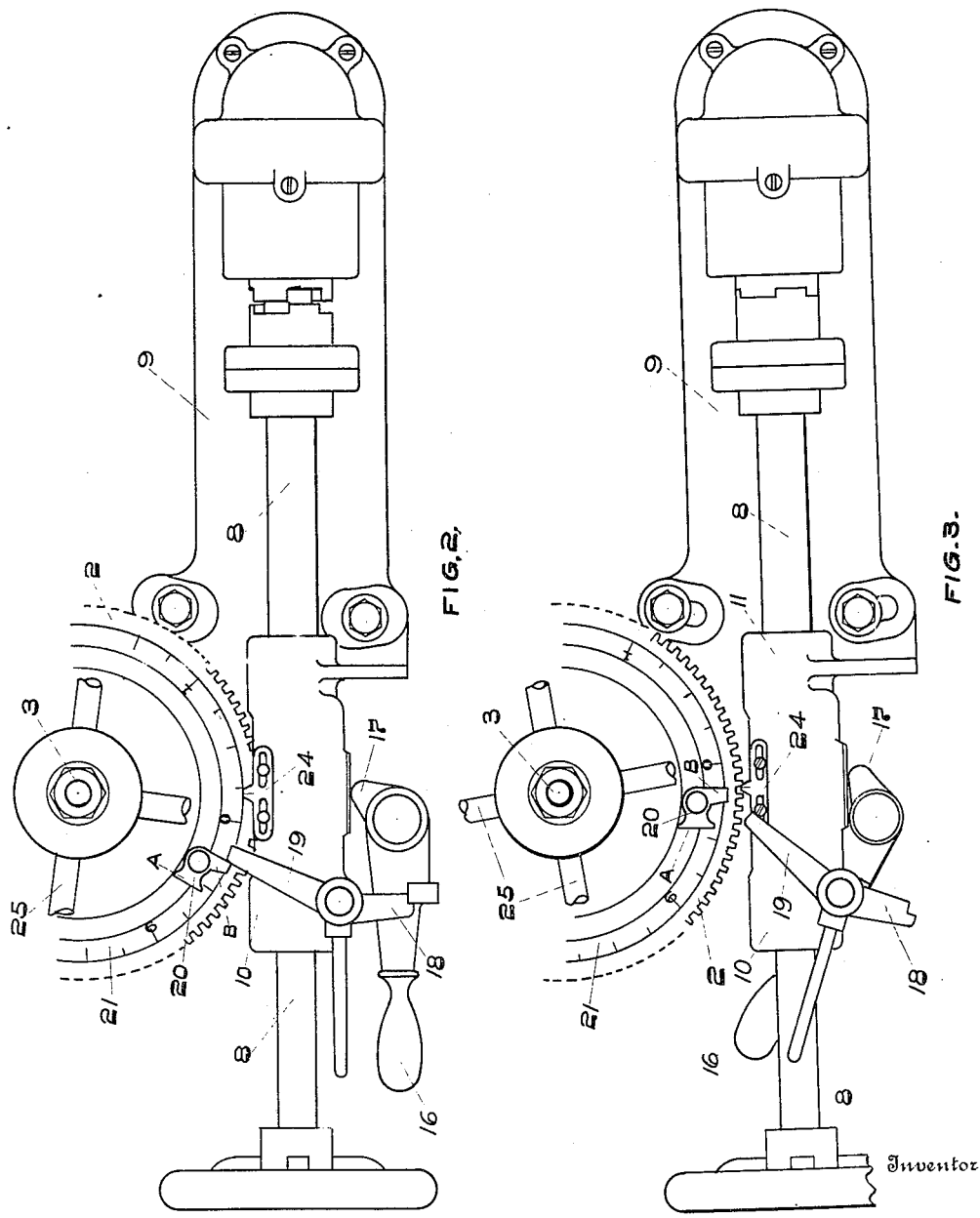

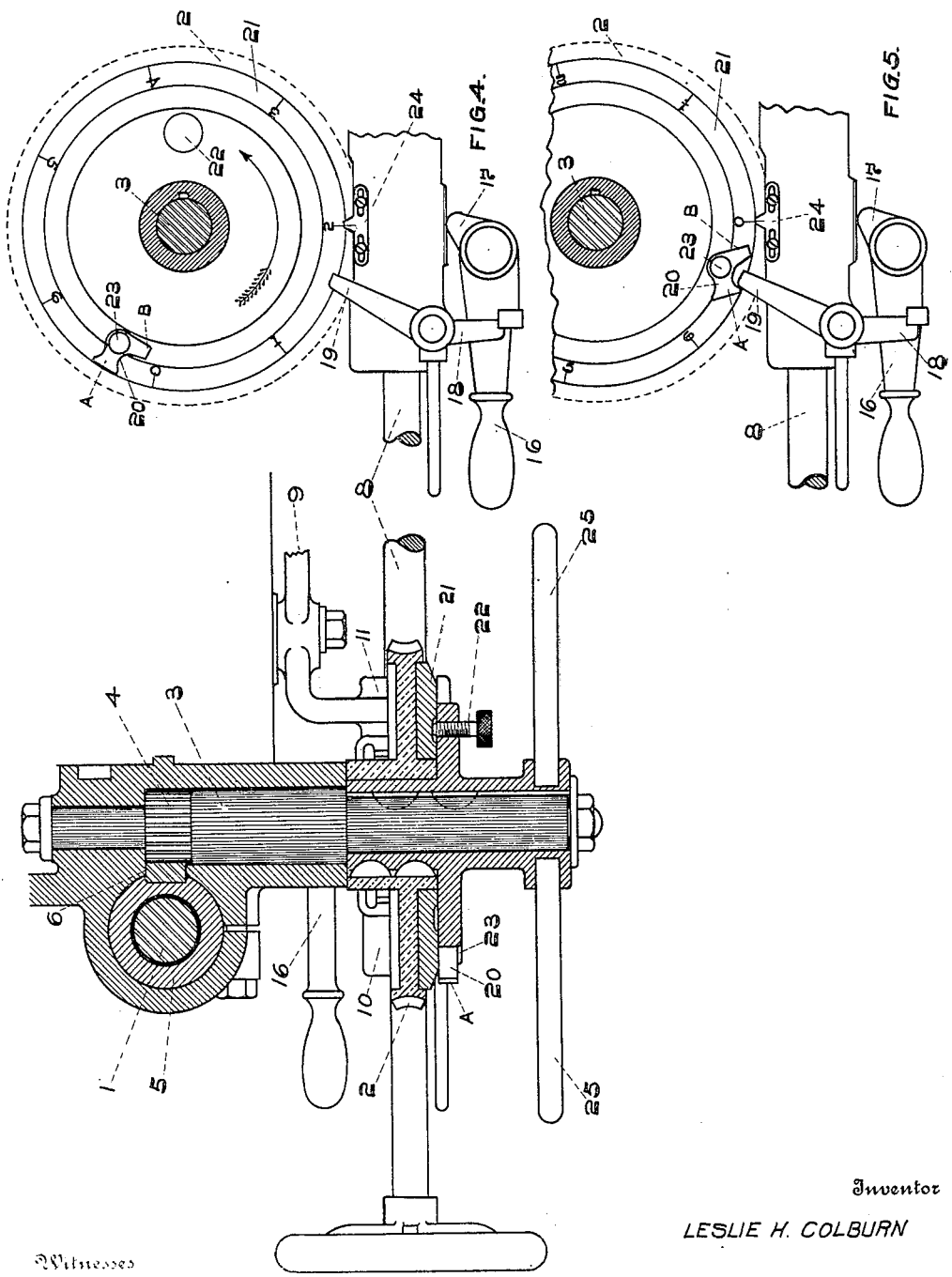

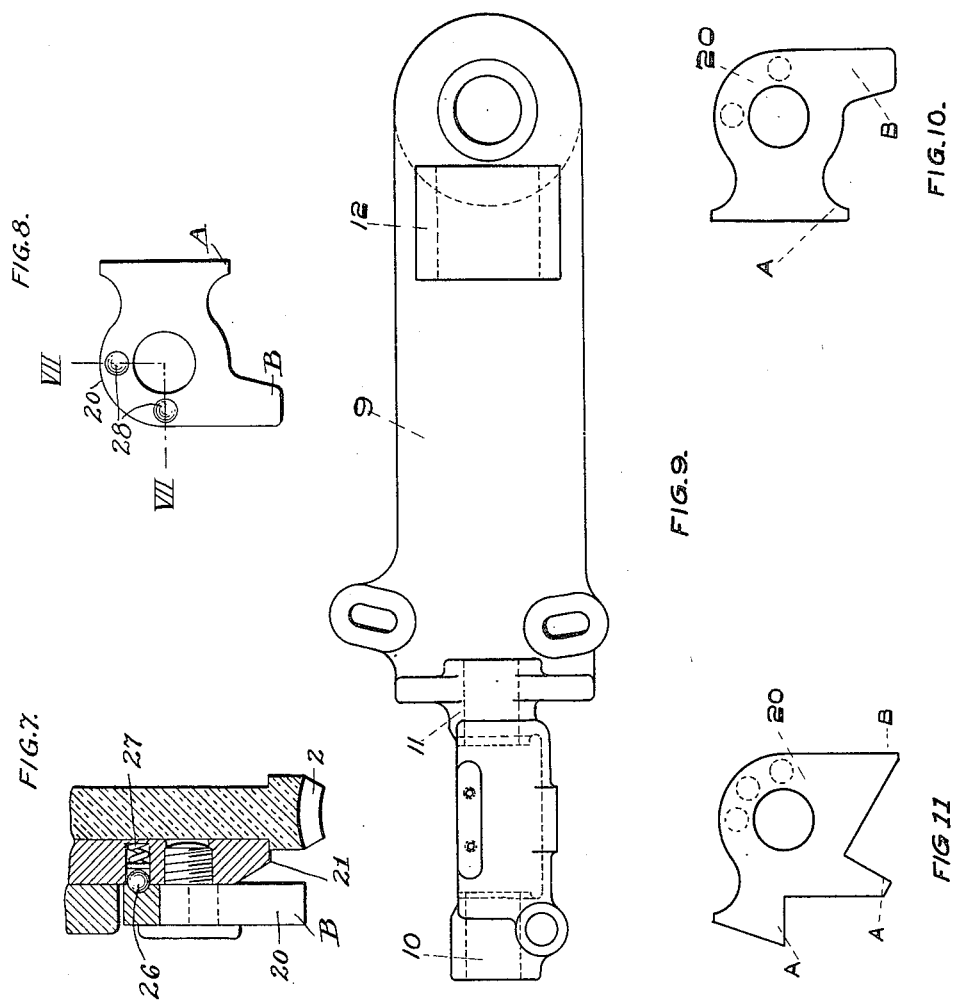

UNITED STATES PATENT OFFICE.

LESLIE H. COLBURN, OF FRANKLIN, PENNSYLVANIA.

AUTOMATIC TRIPPING DEVICE FOR THE FEED MECHANISM OF MACHINE-TOOLS.

1,017,635.   Specification of Letters Patent.   Patented Feb. 13, 1912.

Application filed June 13, 1910. Serial No. 566,560.

*To all whom it may concern:*

Be it known that I, LESLIE H. COLBURN, citizen of the United States, residing at Franklin, in the county of Venango and State of Pennsylvania, have invented certain new and useful Improvements in Automatic Tripping Devices for the Feed Mechanism of Machine-Tools, of which the following is a specification.

The object, construction, operation and application of my invention are herein fully set forth, in such a manner as to enable those skilled in the art of machine-tool construction to make and use the same.

*Object.*—The object of my invention is to provide an automatic trip for the feed mechanism of certain types of machine-tools, by means of which the feed may be tripped or stopped at any desired, predetermined point within the extreme limits of the feed travel.

*Construction.*—The drawings which form a part of this application illustrate one way in which my invention may be practically applied. I have here shown an application of the same to a drill-press and will describe such construction, merely as an illustration of the utility of my invention, but I do not wish to be understood as limiting myself to the particular construction and application which I have shown in said drawings.

In the drawings:—Figure 1 is a side elevation, partly in section, of the feed mechanism of a drill-press, with my automatic trip applied thereto. Fig. 2 is a side elevation of said feed mechanism in the operative position. Fig. 3 is a side elevation of said feed mechanism in the tripped or inoperative position. Figs. 4 and 5 are side elevations of a portion of said mechanism, showing the tripping pawl in different positions. Fig. 6 is a horizontal section on line VI—VI of Fig. 12. Figs. 7, 8, 9, 10 and 11 are details. Fig. 12 is a side elevation of a drill press equipped with my improved automatic trip.

The same reference letters are applied to identical parts in all the views.

As will be readily understood by those familiar with drill-presses, the spindle is movable vertically, and is fed downward when drilling is being done. In the construction here shown, spindle 1 is fed by means of a worm-gear 2 which is keyed to a revoluble feed-shaft 3 having a pinion 4 rigidly affixed to said shaft 3 and preferably formed as an integral portion thereof. The spindle-sleeve 5 is provided with a rack 6 with which pinion 4 meshes for the purpose of feeding the spindle 1.

The gear 2 is driven by a worm 7 which is feathered to a driving-shaft 8 that is revolubly mounted in a pivoted bracket 9, said bracket being provided with the bearings 10, 11 and 12 for the reception of said shaft 8. Shaft 8 may be driven in any suitable way, as by a bevel gear 13 and a pinion 14.

Bracket 9 is adapted to oscillate or swing vertically, as aforesaid, and the pivotal point of same is shaft 15 upon which pinion 14 is mounted, so that worm 7 may be raised into operable engagement with gear 2, as shown in Figs. 1 and 2, or lowered and disengaged therefrom as shown in Fig. 3. For the purpose of raising said bracket, I provide a cam-lever 16 equipped with a cam-projection 17 which impinges upon the under side of bracket 9, said lever being adapted to occupy either of the positions shown in Figs. 2 or 3,—Fig. 2 being the engaged or operative position, and Fig. 3 the tripped or inoperative position, in which worm 7 is out of engagement with worm-gear 2 and does not operate the same. For the purpose of retaining cam-lever 16 in the operative position, I provide a detent-lever which consists of a latch-arm 18 for engaging said lever 16, and a trip-arm 19 which encroaches upon the path of pawl 20 and is adapted to be actuated by said pawl when the same is in the position shown in Figs. 2 and 3, but when the pawl is in the position shown in Figs. 1, 4 and 5, trip-arm 19 actuates the pawl.

Pawl 20 is attached to an indexed, or graduated dial 21 that is revolubly mounted upon the hub of gear 2, but may be prevented from revolving thereon by means of a knurled set-screw 22, the knurled head of which adapts the same for easy, expeditious and convenient hand manipulation without the use of a wrench or other tool. Pawl 20 is attached to dial 21 by means of a pin or stud 23 upon which it swivels, so that it may assume the various positions shown in the drawings. As here employed said pawl is provided with two arms, A and B,—see Fig. 10, and for convenience of reference arm A is termed the swiveling-arm and arm B is designated the tripping arm.

It being desirable to provide yieldable means for retaining pawl 20 in its respective positions, as adjusted and readjusted, I employ a detent, constructed as shown in Fig. 7, which consists of a ball 26, that occupies a socket formed in the dial 21, and positioned back of the pawl 20. In said socket, back of the ball 26 is placed a spiral spring 27 which presses said ball outward. In the rear face of pawl 20 are formed depressions 28, arranged to be occupied by said ball, when the pawl is in its respective adjusted positions: Said ball thus offers sufficient resistance to the movement of said pawl to prevent same from being moved accidentally, or otherwise than in the regular manner.

Dial 21 is graduated, seven graduations being shown in the drawings, which are numbered from 0 to 6 consecutively in the direction which the dial turns, as indicated by the arrow in Fig. 4. An index or pointer 24 is attached to the bracket 9 and a point upon said index extends into close proximity to the graduated portion of the dial, so that the passage and position of the graduations may be accurately indicated and quickly determined.

Index 24 is laterally adjustable so that great accuracy may be attained in its use; any wear of the various parts which may affect the accuracy of the index may be also corrected by said adjustment.

The graduations upon the dial indicate the number of inches which the spindle is fed at each revolution of the dial or fraction thereof, and in this case, one revolution of the dial will cause the spindle 1 to be fed the distance of 7 inches.

A quick return or hand manipulating medium of the spindle is provided by supplying the worm gear hub with suitable handles or levers 25 by which means—when the worm is disengaged from its gear—the feed shaft 3 and the thereto attached pinion 4 may be revolved to raise or lower the spindle 1 quickly.

*Operation.*—In the construction shown, each revolution of the dial feeds the spindle seven inches and the feed may be tripped at any point in one or two revolutions of the dial, which makes it possible to trip the feed at any point in fourteen inches. When pawl 20 is in the position shown in Figs. 1 and 4, the dial may revolve more than one revolution without tripping the feed. If it is desired to trip the feed at any point in less than one revolution, pawl 20 is set as shown in Figs. 2 and 3. The pawl is located at the correct distance from the graduation marked zero so that when the feed is tripped the zero graduation comes directly opposite the line upon index 24. When it is desired to drill a particular depth,—for illustration we will say 6 inches—the operation is as follows:—The feed is tripped, as shown in Fig. 3, and the spindle is run down by means of the handles 25 until the point of the drill rests upon the work; the knurled screw 22 is then loosened and the dial is turned until the graduation "6" is in line with the mark on the index or pointer 24; screw 22 is then tightened to secure the dial in this position: The pawl 20 is then set in the position shown in Fig. 2 and 3, the feed is thrown in by placing the cam lever in the position shown in Figs. 1 and 3, and when the spindle has traveled the distance of 6 inches the tripping arm B of the pawl will come in contact with the trip-arm 19 of the detent lever and cause the feed to trip and stop. When the feed is to travel a depth exceeding seven inches, pawl 20 is set in the swiveling position shown in Figs. 1 and 4, and when the swiveling arm A strikes the trip-arm of the detent lever, said pawl will be turned, as shown in Fig. 5, to the tripping position shown in Figs. 2 and 3 without tripping the feed, but when the pawl again comes in contact with lever 19, the tripping arm B thereof will actuate said tripping lever and trip the feed. If it is desired to drill a depth of 12 inches, the drill is run down by hand until the point of same rests upon the work, the graduation marked "5" upon the dial is set at the index and pawl 20 is set to the swiveling position; this will permit a travel of 5 inches plus a full revolution of the dial or 7 inches, which is a total distance of 12 inches, when the feed will automatically trip.

*Application.*—While I have here shown my improved feed-tripping device applied to a drill press, it is equally applicable to many other types of machine tools, such as boring mills, milling machines, grinding machines, lathes, automatic screw machines etc.

*Modifications.*—The tripping-pawl may be provided with a number of swiveling arms, A, A, as shown in Fig. 11, and in this case the machine would be adapted to permit a corresponding number of revolutions of the dial before the feed mechanism would be tripped, and a correspondingly greater length of feed could be secured. It will be readily understood, therefore, that my invention consists essentially of a driven feed shaft, as 3, adapted to feed the spindle of a drill press, the ram or bar of a boring mill, the carriage of a lathe, or the equivalent tool-carrying element of any other similar type of a machine-tool, a driving shaft, as 8, said driving shaft being equipped with a suitable disengageable transmission device by which motion may be transmitted from said driving to said driven shaft and automatic means for causing the disengagement of said transmission means at any predetermined fractional part of one revolution of said driven shaft, or at any predetermined point in any subsequent revolution of said shaft, to arrest the feed of the spindle or its equivalent.

I claim:—

1. In an automatic trip for the feed mechanism of machine tools, the combination with a disengageable drive for said feed, of a latch arranged to engage said drive for the purpose of retaining same in the operative position, and means for automatically disengaging said latch for the purpose of rendering said drive and the feed inoperative; said disengaging means being arranged to impinge upon said latch at successive intervals and to be positioned so as to actuate the same at any one of said intervals as desired.

2. In an automatic tripping device for the feed mechanism of machine tools, the combination with a disengageable drive for said feed, of a latch arranged to engage said drive for the purpose of retaining same in the operative position, a pawl arranged to impinge upon said latch at successive intervals, said pawl being adjustable so as to actuate said latch or to be actuated and readjusted thereby as desired into actuating position, and means for retaining said pawl in its respective positions of adjustment and readjustment.

3. In an automatic trip for the feed mechanism of machine tools a revoluble shaft, means upon said shaft adapted to feed the tool-holding element of a machine tool, a worm-gear keyed to said shaft, a worm adapted to drive said gear, a shaft to which said worm is keyed, a swinging bracket in which said worm-shaft is revolubly mounted so that said worm may be placed in operative engagement with said gear or disengaged therefrom, a cam-lever adapted to actuate said bracket, and to hold the same in the position in which said worm coöperates with said gear, a detent lever adapted to engage said cam lever for the purpose of holding same in said operative position, a graduated dial revolubly mounted upon the hub of said worm gear, means for securing said dial at a certain position, a tripping device adapted to disengage said detent lever from said cam-lever, said tripping device consisting of a multiple-armed pawl, one of which arms is adapted to actuate said detent lever, the remainder of said arms being adapted to be actuated by said detent lever, and an index indicating the passage and position of the graduations upon said dial.

4. In an automatic tripping device for the feed mechanism of a drill-press a spindle for the reception of a drill, a sleeve through which said spindle passes, a rack upon said sleeve, a pinion meshing with said rack, a shaft to which said pinion is attached, a worm-gear keyed to said shaft, a worm for driving said shaft and disengageable therefrom, a shaft for said worm, a movable bearing for said shaft, a cam operating upon said movable bearing, a lever for said cam for operating the same to place said worm in operable engagement with said gear, a detent lever adapted to engage said cam-lever to hold same in the operative position, a graduated dial revolubly mounted upon the hub of said worm gear, means for securing said dial at a determined position, a pawl secured to said dial and having a plurality of arms, one of said arms being adapted to actuate said detent lever to cause the disengagement of said detent lever from said cam lever, the remainder of said arms being actuated by said detent lever, and an adjustable index positioned approximate to the graduations upon said dial.

In testimony whereof I affix my signature in presence of two witnesses.

LESLIE H. COLBURN.

Witnesses:
JOHN L. MCBRIDE,
WM. B. GRIFFEN.